(12) United States Patent
Carter et al.

(10) Patent No.: US 10,891,430 B2
(45) Date of Patent: Jan. 12, 2021

(54) SEMI-AUTOMATED METHODS FOR TRANSLATING STRUCTURED DOCUMENT CONTENT TO CHAT-BASED INTERACTION

(71) Applicant: FUJI XEROX CO., LTD., Tokyo (JP)

(72) Inventors: Scott Carter, Menlo Park, CA (US); Laurent Denoue, Vento (IT); Matthew L. Cooper, San Francisco, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/887,927

(22) Filed: Feb. 2, 2018

(65) Prior Publication Data
US 2019/0243889 A1 Aug. 8, 2019

(51) Int. Cl.
*G06F 40/174* (2020.01)
*G06F 3/0488* (2013.01)
*G06K 9/00* (2006.01)
*G06F 16/332* (2019.01)
*G06F 40/103* (2020.01)

(52) U.S. Cl.
CPC ........ *G06F 40/174* (2020.01); *G06F 3/04883* (2013.01); *G06F 16/3329* (2019.01); *G06F 40/103* (2020.01); *G06K 9/00469* (2013.01)

(58) Field of Classification Search
None
See application file for complete search history.

(56) References Cited

U.S. PATENT DOCUMENTS

| | | | |
|---|---|---|---|
| 2009/0217149 A1* | 8/2009 | Kamien | G06F 17/30038 715/230 |
| 2013/0198628 A1* | 8/2013 | Ethier | G06F 3/0484 715/709 |
| 2015/0142706 A1* | 5/2015 | Gilbert | G06N 5/02 706/11 |
| 2015/0277744 A1* | 10/2015 | Tang | G06F 3/04883 715/863 |
| 2016/0260179 A1* | 9/2016 | Yu | H04L 51/18 |
| 2016/0285816 A1* | 9/2016 | Schmid | G06Q 30/0631 |
| 2018/0121394 A1* | 5/2018 | Denoue | G06F 40/106 |
| 2019/0036853 A1* | 1/2019 | Denoue | H04L 51/046 |

OTHER PUBLICATIONS

SPACE10 Nov. 28, 2016 https://medium.com/space10/introducing-the-conversational-form-c3166eb2ee2f.*

(Continued)

*Primary Examiner* — Scott T Baderman
*Assistant Examiner* — Steve P Golden
(74) *Attorney, Agent, or Firm* — Procopio, Cory, Hargreaves & Savitch LLP

(57) ABSTRACT

A method of converting a document from a first structure to a second structure, includes extracting data of the document to associate a field and a label in the first structure to generate a field/label association, receiving operator input indicative of associating a field/label association with one or more other field/label associations to generate a grouping, and based on the operator input and a spatial arrangement of the first structure, providing the grouping in the second structure as a natural conversational unit.

15 Claims, 16 Drawing Sheets
(12 of 16 Drawing Sheet(s) Filed in Color)

(56) References Cited

OTHER PUBLICATIONS

Microsoft.com, Basic Features of FormFlow, Dec. 14, 2017, [online] [retrieved Feb. 1, 2018] URL: https://docs.microsoft.com/en-us/bot-framework/dotnet/bot-builder-dotnet-formflow.

Fobio.io, Create Awesome Chatbots using Google Forms, [online] [retrieved Feb. 1, 2018] URL: https://fobi.io/#/enter-form.

Space 10, Introducing the Conversational Form [online] [retrieved Feb. 2, 2018] URL: https:https://medium.com/conversational-interfaces/introducing-the-conversational-form-c3166eb2ee2f.

Juniper Research, Chatbots, A Game Changer for Banking & Healthcare, Saving $8 Billion Annually by 2022, Hampshire, UK, May 9, 2017, [online] [retrieved Feb. 2, 2018] URL: https://www.juniperresearch.com/press/press-releases/chatbots-a-game-changer-for-banking-healthcare.

Grand View Research, Chatbot Market Analysis by End User, by Application/Business Model, by Type, by Product Landscape, by Vertical, by Region (North America, Europe, APAC, MEA), and Segment Forecasts, 2015-2025, Aug. 2017, [online] [retrieved Feb. 2, 2018] URL: https://www.grandviewresearch.com/industry-analysis/chatbot-market.

Accot, J., et al., More Than Dotting the I's—Foundations for Crossing-Based Interfaces, CHI '02 Proceedings of the SIGCHI Conference on Human Factors in Computing Systems, Minneapolis, MN, Apr. 20-25, 2002, p. 73-80.

Clark, C., et al., Looking Beyond Text: Extracting Figures, Tables, and Captions from Computer Science Papers, Association for the Advancement of Artificial Intelligence, 2015, [online] [retrieved on Feb. 2, 2018] URL: https://ai2-website.s3.amazonaws.com/publications/clark_divvala.pdf.

Meunier, L-C, Optimized XY-Cut for Determining a Page Reading Order, Proceedings Eighth International Conference on Documents Analysis and Recognition, Jan. 16, 2006.

Xu, C., et al., Graph-Based Layout Analysis for PDF Documents, Proceedings of the SPIE, 8664, Mar. 2013.

U.S. Appl. No: 15/665,366, filed Jul. 31, 2017 (unpublished).

* cited by examiner

900

905

901

903

Part 1. Information About You (Cont'd)

Prior Spouse's Name:

Last Name (Family Name)    First Name (Given Name)

Middle Name    Date of Marriage

Place of Marriage

Date of Termination    Place of Termination

SEMI-AUTOMATED METHODS FOR TRANSLATING STRUCTURED DOCUMENT CONTENT TO CHAT-BASED INTERACTION

BACKGROUND

Field

Aspects of the example implementations relate to methods, systems, and interfaces to enable conversion of PDF and web-based documents that solicit user input into chat-based dialogues. More specifically, the example implementations are directed to methods, systems and interfaces in which document data is extracted to associate fields and their textual descriptions using meta-data and lightweight visual analysis, and the field labels, their spatial layout, and associated text descriptions are further analyzed to group related fields into natural conversational units, which are in turn converted into user queries in chat interfaces.

Related Art

Entities, such as businesses and other organizations, need to obtain information associated with their users or customers. Many entities use a related art approach that is document-centered, or even paper-centered. Another related art approach is enterprise chat, which is an online, conversation-based approach for entities such as businesses to interact with consumers, including the use of chatbots to query users and obtain information.

In order for entities to adopt enterprise chat for obtaining customer information, the related art document-centered or paper-centered approaches must be modified. One related art problem that entities face in making the transition from document-centered to chat-centered interaction is that documents are inherently more structured than chat. For example, information that is entered into related art forms according to a document-centered approach can flow directly into backend databases and processes.

On the other hand, chat operates via natural language, which appeals to customers for convenience, but requires different styles of organizing content, as well as more flexible recognition technologies. Accordingly, there is a need to translate paper- and web-based documents into chat interfaces, as well as a need for techniques to understand unstructured user responses in such a way that they can be reflowed into pre-existing backend databases and processes.

Related art approaches to convert structured document content into chat-based interactions have focused on purely automatic document analysis. However, these related art approaches have various problems and disadvantages, such that they are not sufficient to solve the problem of converting structured documents to conversational interfaces. For example, but not by way of limitation, translating structured document content to a conversational format is rarely straightforward. Moreover, if the output of third-party document analysis tools is forwarded directly to users, the result is a chat bot interface that is at best unusable, and at worst, may encourages users to submit inaccurate information.

SUMMARY

Aspects of the present application may relate to a method of converting a document from a first structure to a second structure, includes extracting data of the document to associate a field and a label in the first structure to generate a field/label association, receiving operator input indicative of a associating field/label association with one or more other field/label associations to generate a grouping, and based on the operator input and a spatial arrangement of the first structure, providing the grouping in the second structure as a natural conversational unit.

According to another aspect, the first structure is a document-based structure and the second structure is a chat-based structure.

According to another aspect, the operator input is non-automated input that is provided by an administrator.

According to another aspect, the operator input comprises at least one of a gesture and a line.

According to another aspect, for the operator input provided at the first structure, the grouping comprises the field/label association and the one or more other field/label association or an open label, and the natural conversation unit comprises a single query including the field/label association and the one or more other field/label association or an open label.

According to another aspect, for the operator input provided at the first structure, the grouping comprises the field/label association and the one or more other field/label associations including a corresponding plurality of checkboxes, and the natural conversation unit comprises a single query including the field/label association and the one or more other field/label association or an open label associated with the plurality of checkboxes.

According to another aspect, for the operator input at the second structure, the operator input comprises at least one of an edit of a format of the natural conversation unit, and an edit of a sequence of the field/label association and the one or more other field/label association.

According to another aspect, wherein an ordering of the field/label association with the one or more other field/label associations in the second structure is arranged based on an ordering of the field/label association with the one or more other field/label associations in the first structure, or in response to the operator input.

According to another aspect, an end user input received via the second structure in response to the natural conversational unit is provided to the first structure based on the field/label association and the another field/label association.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 9 illustrates grouping of field/label associations, and an associated tool for performing the grouping, according to an example implementation.

FIG. 10 illustrates grouping of field/label associations, and an associated tool for performing the grouping, according to an example implementation.

FIG. 11 illustrates grouping of field/label associations, and an associated tool for performing the grouping, according to an example implementation.

FIG. 12 illustrates grouping of field/label associations, and an associated tool for performing the grouping, according to an example implementation.

DETAILED DESCRIPTION

Figure 1:
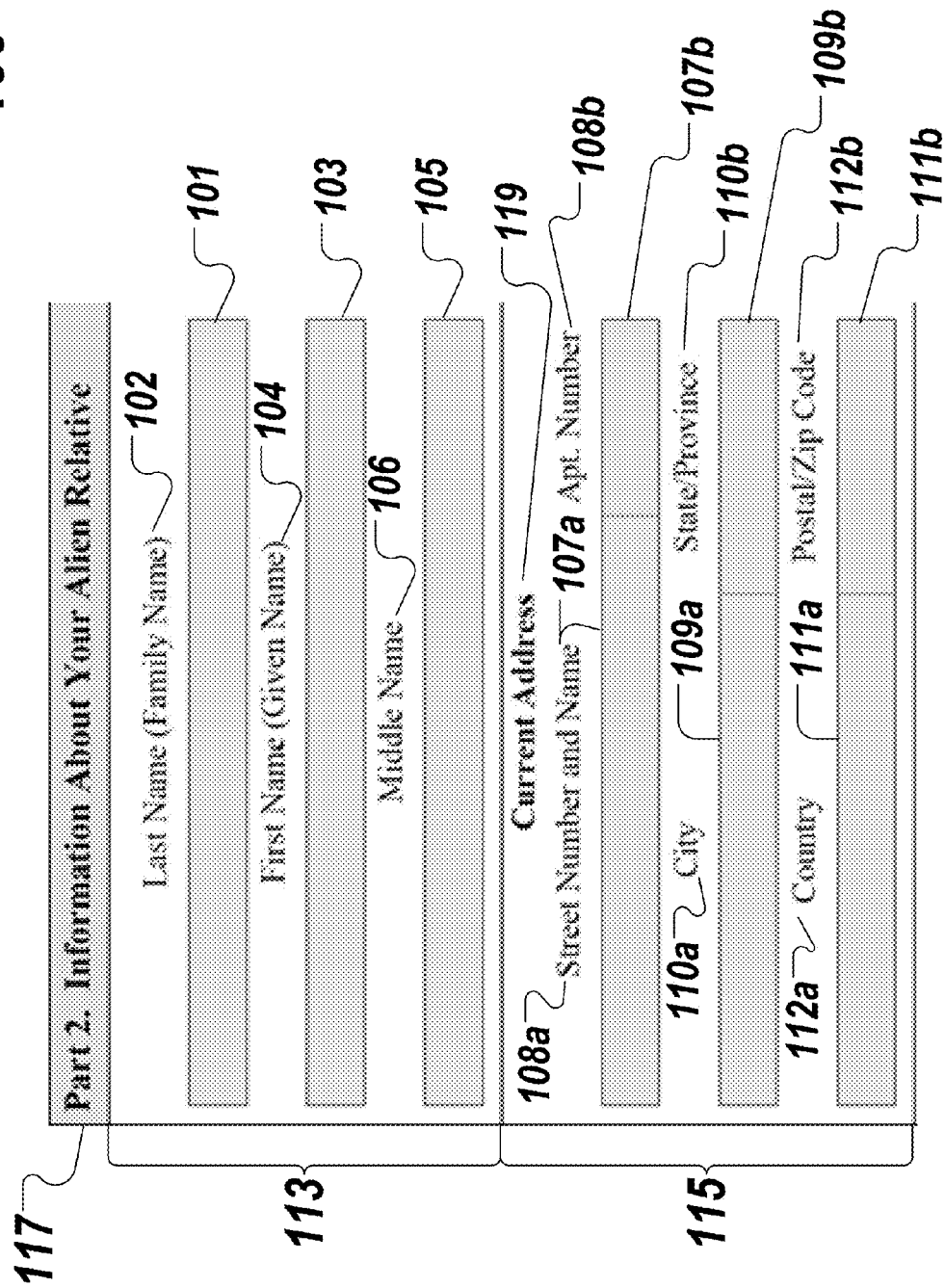
FIG. 1 illustrates a related art document-centered form.

The following detailed description provides further details of the figures and example implementations of the present application. Reference numerals and descriptions of redundant elements between figures are omitted for clarity. Terms used throughout the description are provided as examples and are not intended to be limiting. As used herein, the term "users" generally refers to one or more entities that interact with the chat-based interface to enter information that is desired by an enterprise. Separately, the term "administrators" refers to one or more entities that interact with the interface of the example implementations by performing input (e.g., non-automated input) or other operations, as explained in greater detail below. While the above terms are used herein for the sake of simplicity, other terms may be substituted therefor to describe these relations as would be understood by those skilled in the art. Moreover, the term "entities" may refer to one or more individuals, account holders, owners of accounts and/or devices, organizations or other members that interact with the example implementations or perform processes thereon.

Example implementations are directed to methods, systems and interfaces associated with conversion from a document based approach to a chat-based interaction. More specifically, methods and interfaces are described to enable conversion of PDF and web-based documents that solicit user input into chat-based dialogues. According to the example implementations, document data is extracted to associate fields and their textual descriptions using metadata and lightweight visual analysis. Further, the field labels, their spatial layout, and associated text descriptions are analyzed to group related fields into natural conversational units, which are converted into questions presented to users in chat interfaces, to solicit information that is required by the entity associated with the chat. For example but not by way of limitation, the information may be required for the original documents and the processes that they support. The user-supplied data received via the chat can optionally be inserted into the source documents and/or in downstream databases.

According to the example implementation, a semi-automated administrator tool is provided that can produce usable conversational interfaces based on structured documents. First, structured documents are converted into conversations. Structured documents (e.g., forms), are organized as collections of fields and their associated labels. Related art direct approaches to converting forms to conversations would associate labels with fields, sends the label to the user as a message with a "?" appended, and injects the user's response back into the field.

However, the related art approach has many problems and disadvantages. For example, but not by way of limitation, labels may not be written in the style of questions, and thus, injecting the labels directly into conversations without providing the administrator with an ability to modify the labels or the chat display would be jarring. Further, in many cases fields and labels must be grouped together, such that simply sending field/label to the user as a sequence one-by-one questions would be confusing (e.g., sending a set checkboxes and their labels) or at least inefficient (e.g., requesting the customer enter their first, middle, and last name all separately instead of grouping them together). Additionally, chat has a linear format that requires that field/label pairs to appear in a particular order that may be important as well as unclear from the source form.

According to the example implementations, an administrator is provided with a tool to convert from the structured approach of a document-based scheme to a chat-based approach that is conversational in structure. The tool includes but is not limited to performing the operations of converting labels into questions, associating labels and fields as well as grouping associated labels and label/field pairs, and ordering associated pairs, groups, and other labels.

In more detail, the example implementations are directed to associating labels and fields as well as grouping associated labels and label/field pairs, and ordering associated pairs, groups, and other labels. A semi-automated tool, including a computer-implemented method supported by interface for an administrator to provide input and view the structures, as well as corresponding non-transitory computer-readable medium, and apparatus (e.g., mobile phone), are provided.

With regarding to associating, example cases of web forms and form-enabled paper forms are considered. For web forms, associating labels and fields is in many cases trivial, as fields and labels are bound together in HTML (hypertext markup language) markup through "name" and "for" fields. For example, but not by way of limitation, the HTML "<input . . . name=myName>" is linked to "<label . . . for=myName>". For form-enabled paper (PDF) forms, similar markup may be available in the PDF content itself. If not, the system can use tools that would be known to those skilled in the art to perform the association.

Grouping and ordering may be used for translating content from forms to chat interfaces, and there is no related art tool to provide support for an administrator to provide input and manage this process in a manner that addresses the above-noted related art issues. The example implementation is thus directed to new methods and systems for grouping and ordering, which combine offline analysis with an interface that takes advantage of familiar actions by an administrator.

According to the example implementations, the interface provides functionality as well as input/output and related structure to group together associated pairs of fields and labels, as well as form text that may not be associated with any field, also referred to as "open labels". The interface also then must order individual associated pairs, open labels, as well as groups. The interface also provides functionality as well as input/output and related structure to associate fields and labels, in case the analysis fails.

The example implementations provide one or more approaches for an administrator to associate, group, and order fields. These approaches include but are not limited to a crossing-based interface, and a click-based interface. Those skilled in the art will recognize that other similar approaches may be substituted therefor without departing from the inventive scope.

According to one example approach of the crossing interface, a plurality (e.g., two) gestures for grouping (e.g., regions) and ordering (e.g., lines). The gestures may be simple gestures; however, other gestures that are more complex or indicative of symbols or special instructions may also be provided. For example, drawing a region or line associates all label/field pairs and open labels with boundaries that cross that region or line. This example approach is discussed in greater detail below with respect to FIG. 7.

By the administrator grouping label/field pairs and open labels together in the interface, the backend chat generation system is provided with an indication (e.g., signal) that all of those elements should be combined into a single question to the chat user; this feature is discussed in greater detail below with respect to FIG. 7. According to one example implementation, checkboxes may be grouped together to trigger other changes in the chat dialog, such as enumeration; this feature is discussed in greater detail below with respect to FIG. 8.

In another gesture, such as providing (e.g., drawing) a straight line down and/or to the right, one or more operations may be performed that orders label/field pairs, open labels, and groups. If the gesture (e.g., mark) starts on an item that is already ordered, then the ordering may enumerate up from that position. Alternatively, the ordering enumerates up from the current maximum ordered item; this feature is discussed in greater detail below with respect to FIG. 9. Further, according to the example implementations, label/field associates themselves may have no notion of ordering; in that case, lines may only create associations; this feature is discussed in greater detail below with respect to FIG. 10. Other gestures may be used to perform other functions; for example, but not by way of limitation, to cancel a group, the administrator can input a scribble gesture that passes through a subset of the items in the group or label/field pair; this feature is discussed in greater detail below with respect to FIG. 11.

In addition the above-described approach, the example implementation also includes a click-based interface for grouping by an administrator. With this example implementation, the administrator may provide an input (e.g., click) on label/field pairs, open labels, or groups to order or group them. For example, clicking on a red "x" that appears on hover will cancel a grouping or association; this feature is discussed in greater detail below with respect to FIG. 9. Administrators may directly toggle on and edit the ordering numbers beside each label/field pair or group, to manually change their order. Since label/field pairs have no ordering, clicking on labels and fields associates or de-associates them, without regard to the current mode.

These foregoing modes or approaches also referred to as "crossing" and "clicking", can be combined. For example, the user can use crossing lines to group elements but then adjust the ordering exclusively through editing labels.

The administrator input may also be directed form the chat interface to the correct field back in the original paper- or web-document. For basic field/label associations, when an administrator clicks on a question in the chat inspector, the form viewer automatically navigates to the field, label, or group associated with that question. When the question in the chat view refers to a group, the administrator can edit the ordering of the fields in the group to make sure they will match the ordering that the user will supply. These features are discussed in greater detail below with respect to FIG. 12. The administrator may use a separate panel (e.g., interface) to enforce other syntax rules on the user's response (e.g., that the response should be a choice from a list, open text, open numeric, day/time, or, for experts, a regular expression). Dialog tools may be used to enforce a variety of constraints on user responses in terms of formatting. These include, but are not limited to, the type of the data supplied (e.g. numeric, text, element in enumerated list), and may have facilities for guiding users to supply data compatible with expected formatting.

To remap user responses to the original source document, the ordering and grouping needs to be inverted faithfully. In cases such in which multiple (e.g., three) name fields are grouped in one chat question, string processing can be applied, with the assumption that the multiple user names are entered in the order and delimiter requested. In the case of the second chat question (e.g., on the place and date of marriage as noted below), additional string format cues can be required and used to distinguish the place and date. This feature is discussed in greater detail below with respect to FIG. 12.

Optionally, the example implementations may allow the administrator to use further tools to perform customizations. For example, but not by way of limitation, the administrator may provide a customization based on user information (e.g., demographics or historical use). Also, the tool may provide an option for a user to provide feedback to the enterprise, administrator or other third party that can be incorporated into future design changes of the chat by the administrator. Such feedback may be gathered by manual user entry, passive review of user metrics on answers to questions, or completion of the chat session, or other information.

According to other implementation, the system may apply techniques to recognize aspects of the administrator input, such as a gesture shape, curve, etc. This information may be used by the system or the administrator, to provide recommendations for association or grouping, based on past administrator actions associated with a gesture. Artificial intelligence techniques may also be adopted to provide recommendations to the administrative with respect to the output of the chat view.

Further, the administrator may include other features by use of the tool. For example, but not by way of limitation, the user may provide a progress bar or estimated completion time to the user. The administrator or system may use progress and completion information as feedback to further optimize the system. As explained above, the user may be provided with a feedback tool to manually provide such information.

Additionally, where the chat is being performed in certain applications or products having features that allow prior information to be preserved for subsequent use (e.g., name or address information in an auto-fill), the tool may provide the administrator with an option to import such information into the answers to the chat, and simply ask the user to verify that the auto-filled information is accurate and complete.

Further, the tool may permit the user to provide logic that dynamically changes the sequence of questions, or the questions being provided to the user. Further, logic may be provided such that depending on the answer to a current question, different questions or sequences of questions may be provided.

FIG. 1 illustrates an example of document content 100. According to this example, a structured set of fields and labels are provided in groups. More specifically, in a first group 113, fields for last name 101, first name 103, and middle name 105 provided. Similarly, in a second group 115, fields for street number and name 107a, apartment number 107b, city 109a, state/province 109b, country 111a, and postal/ZIP Code 111b, are provided.

For each of the fields noted above, corresponding labels are provided. For example, in the first group 113, a label for last name 102 is associated with the field for last name 101, a label for first name 104 is associated with the field for first name 103, and a label for middle name 106 is associated with the field for middle name 105. Similarly, in the second group 115, labels 108a and 108b are respectively associated with fields 107a and 107b, for street number/name and apartment number, respectively, as well as labels 110a and 110b, respectively associated with fields 109a and 109b, for city and state/province; labels 112a and 112b are respectively associated with fields 111a and 111b, for country and postal/ZIP Code. Optionally, additional header information 117, which shows the part of the document, or group identification information 119, which identifies or describes the second group 115, for example, may be provided.

While the foregoing description of FIG. 1 shows an example of structured document content, it should be understood that the related art structured document content is not limited to the specific structure, grouping, fields and labels, or content shown therein. Those skilled in the art would understand that structured document content is well known in the art, and may include other types of relationships between labels, fields and groups.

Figure 2:
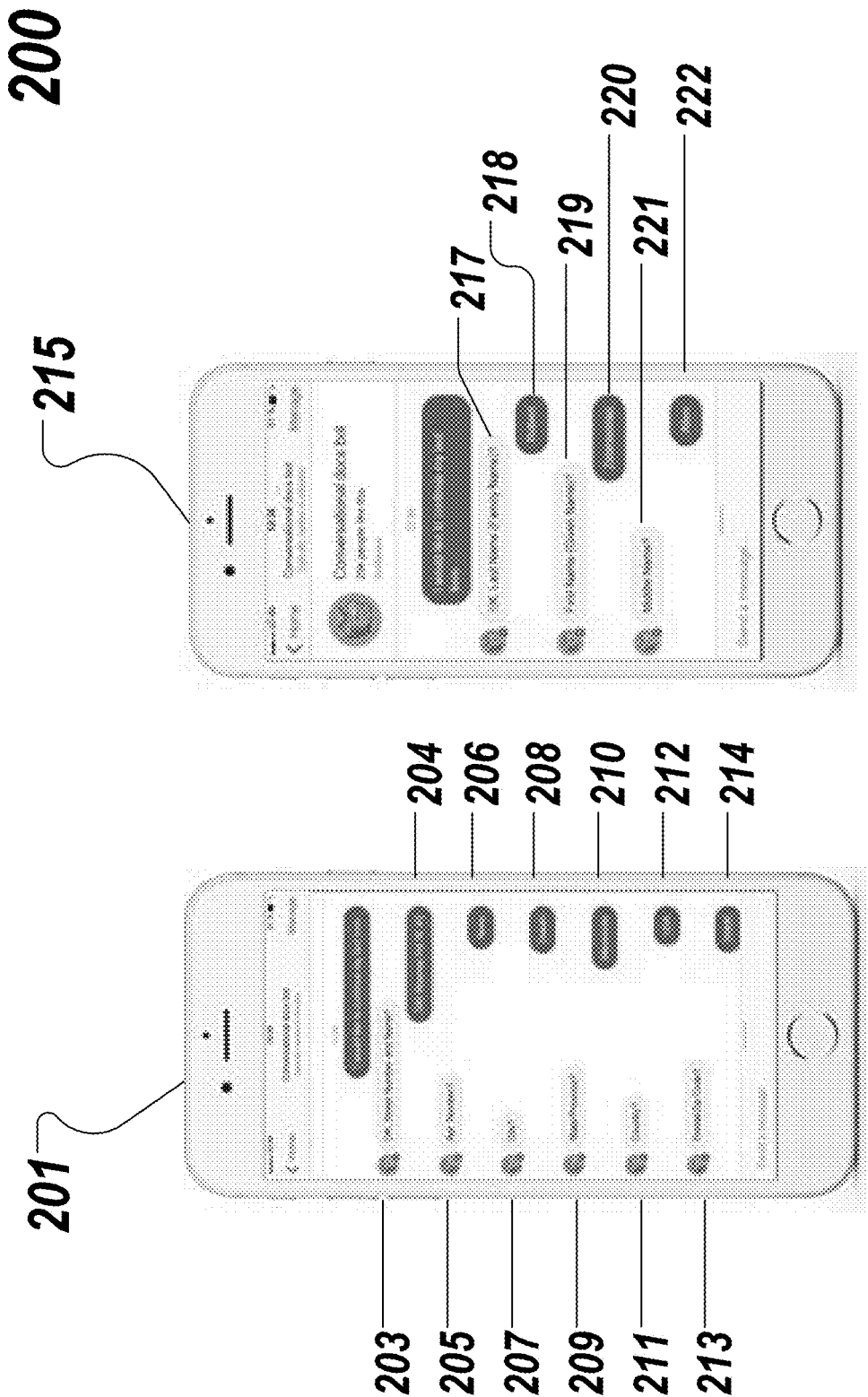
FIGS. 2a-2b illustrate results of a direct conversion of a structured document using an automatic related art approach.

FIGS. 2a and 2b illustrate interfaces 200 of chat-based interactions associated with a process of converting a structured document directly or automatically, based on output of document analysis tools. According to the conversion, each of the labels and fields from the structured document of FIG. 1 are converted into a series of sequential questions that the user is provided. For example, as shown in a first interface 201 in FIG. 2a, for the second group 115 associated with information identified as the current address 119, the chat bot first asks the user to provide a street number and name at 203, and the user answers by providing at 204. Similarly, sequential questions that follow the sequence of fields are provided at 205, 207, 209, 211 and 213, which are respectively followed by answers at 206, 208, 210, 212 and 214. Further, as shown in a second interface 215 in FIG. 2b, questions 217, 219, 221 are sequentially provided based on the fields and labels of the first group 113, followed by sequential answers 218, 220, 222.

In the forgoing direct or automatic conversion approach, related art document analysis tools attempt may automatically associate all of the labels with fields. There are various related art problems or disadvantages that may occur. For example, but not by way of limitation, in many cases, these tools often fail to even make the correct association between field and label, resulting in incorrect (or empty) labels. However, even if all field/label associations are correctly mapped from the structured document, and those labels are used for a conversational interface, the resulting chat bot interaction is unnecessarily complicated for the user, as shown in FIGS. 2a and 2b.

To address the foregoing related art issues, aspects of the example implementations provide an administrator with the ability to input information related to grouping and ordering-field/label associations, which in turn allows the interface to generate a single question for the user.

Figure 3:
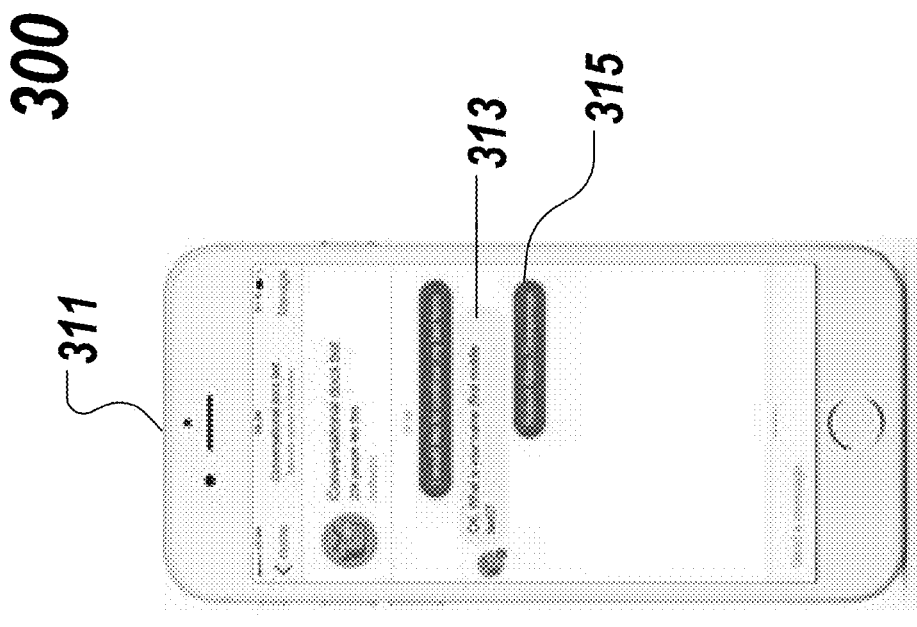
FIGS. 3a-3c illustrate results of a conversion of a structured document to a chat-based interaction according to an example implementation.
Figure 3:
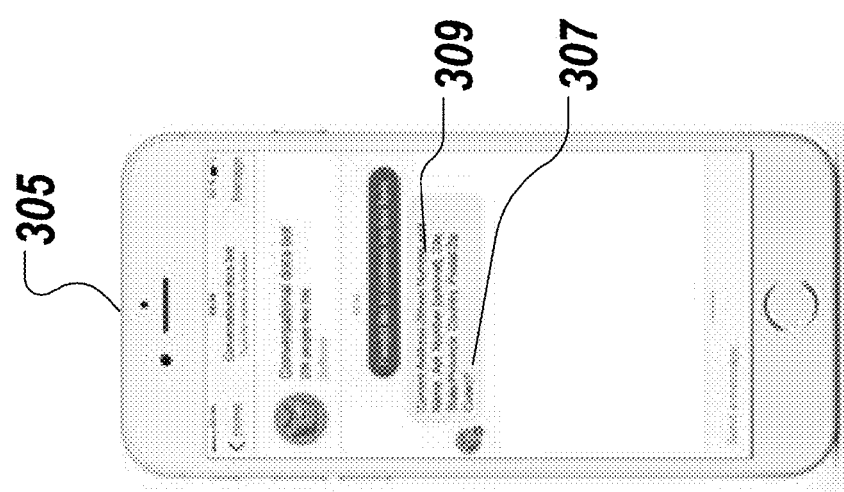
Figure 3:
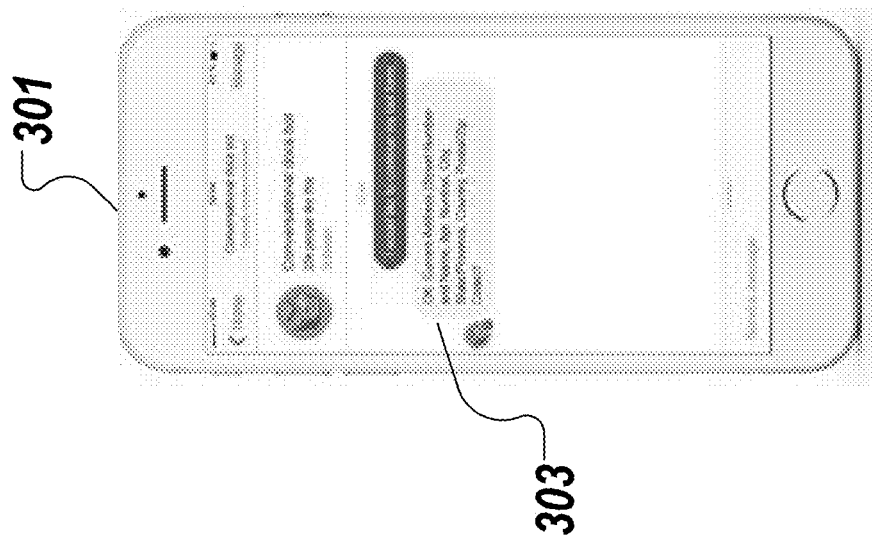

For example, but not by way of limitation, as shown in FIGS. 3a-3c, instead of having a series of separated questions for current address information associated with a group, a single, concise question is provided to the user in chat interfaces 301, 305, 311. For example, as shown in FIG. 3a at 301, the user may enter all of the information associated with fields 107a, 107b, 109a, 109b, 111a and 111b, as a single question 303 received from the chat bot, without requiring individual and separate questions. In other words, the system generated the guide "(Street Number and Name, Apt. Number, City, State/Province, Country, Postal/Zip Code)" with a separator character ",".

In this example implementation, using a semi-automatic interface, guide text is generated automatically from the ordered labels within the group, along with embedded separator characters (e.g., a comma or space) so that the user's response can be parsed. Similarly, as shown in FIG. 3b at interface 305, in the single question 307, an indication 309 may be provided that one or more fields are optional. As shown in FIG. 3c, at interface 311, the user is provided with a single question 313 that queries as to the first, middle and last name, and the user provides an answer 315 as a single entry.

Figure 4:
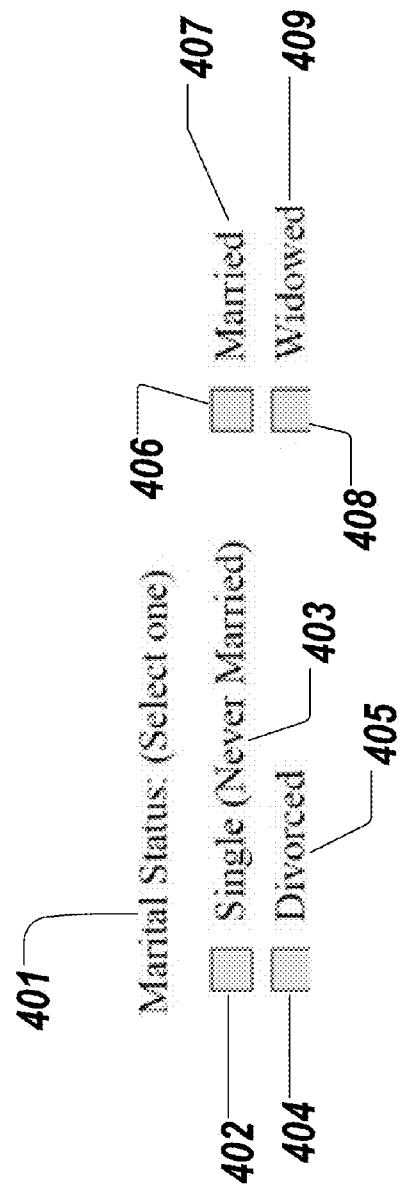
FIG. 4 illustrates a related art document centered form.

In addition to the foregoing, other problems or disadvantages may occur in the related art direct or automatic conversion tools. For example, FIG. 4 illustrates a grouping 400 in a related art structured document. More specifically, a group identifier is provided, directed to a marital status. Further, fields 402, 404, 406 and 408 are provided as checkboxes, and are directed to respective values labeled as labels 403, 405, 407 and 409, respectively.

Figure 5:
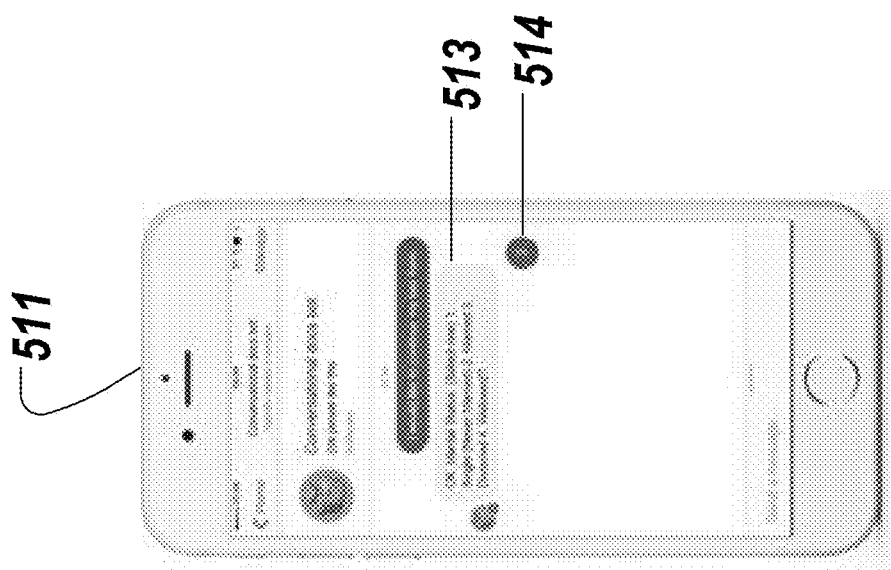
FIGS. 5a-5b illustrates a comparison of conversion from a structured document to a chat-based interaction using a related art automatic approach, as compared with an example implementation.
Figure 5:
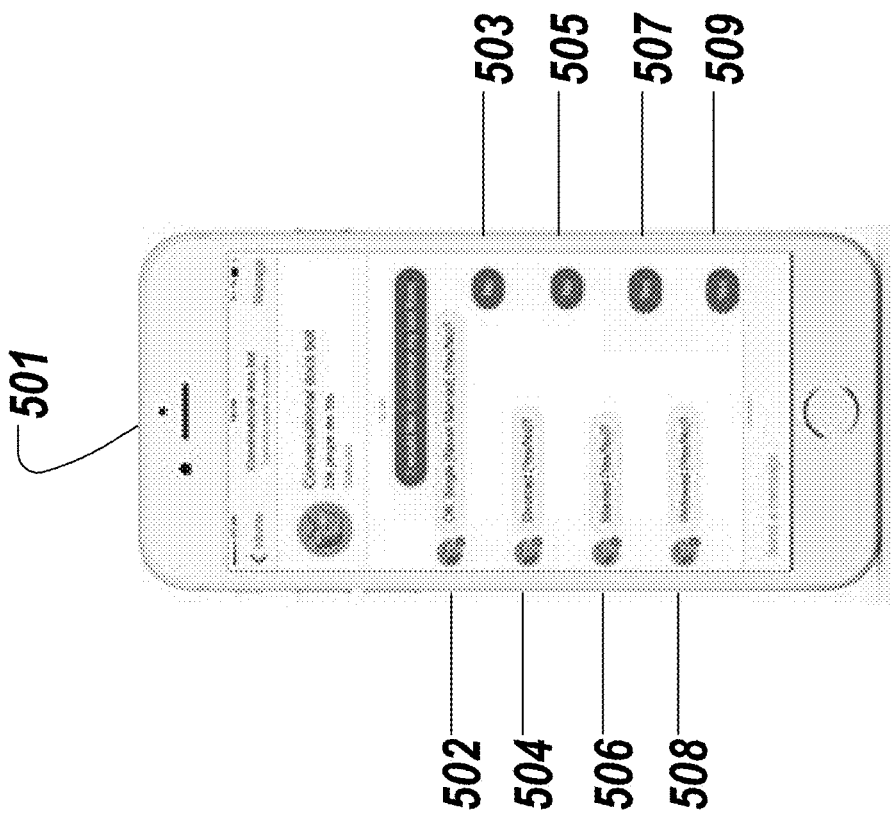

FIG. 5a illustrates interfaces 500 associated with a conversion directly from document analysis tools, including an interface 501 that is conversational. The related art approach provides questions and answers are provided in separate sequence. For example, in question 502, the user is queried as to whether the marital status is single or never married, as a yes/no answer that was previously associated with a checkbox 402 in FIG. 4. Once the answer provided by the user is input at 503, the interface 501 continues with the next question of the group in sequence at 504, at which point the user must provide an answer 505. The user is similarly asked the remaining questions associated with the fields and labels in the group at 506 and 508, which prompts answers at 507 and 509, respectively. According to this related art implementation, a user is permitted to provide multiple "yes" answers to a group of questions for which there should only be a single "yes" answer.

For PDFs and web pages, checkboxes are encoded as separate form elements, and therefore an automatic approach to conversion of these structured documents into a conversation-based approach would produce an interface that generates a question for each checkbox. In this case, the open label, "Marital Status (Select one)" is lost since it is not associated with any field. Furthermore, since the checkboxes are not grouped, the user must answer each individually, and in some cases this can lead to errors in responses (e.g., responding "Yes" to two fields).

Thus, the related art approach results in incorrect information being entered by the user, due to the manner in which the user is guided to answer questions, which is in turn based on the direct, automatic manner in which the structured document is converted to a chat based interaction.

In contrast, the example implementations, as shown in an interface 511 of FIG. 5b for example, provide for manual controls such that the open label is grouped with the other field/label associations, and the resulting conversational interface restricts the user to a single response, as intended. More specifically, a single query 513 is provided that includes the labels associated with all of the fields in the grouping. Thus, the user provides a single response 514.

Example implementations are thus directed to a tool that includes interfaces by which an administrator can verify or revise automatic field groupings and the ordering of information that is presented to users. Accordingly, users may make changes to system generated summaries of field/label groupings. As shown above, this can be used to indicate that some fields are optional. For example, in element 309 of FIG. 3b, the administrator can indicate that "Apt. Number" is optional.

If only a single entry is optional in a list, this is unambiguous (e.g., the system can assume that the option entry is not present if the user's response is a list of n−1 elements). However, if more than one entry is optional, the system will not be able to confidently parse the resulting user response. Therefore, the administrator interface may prompt the administrator to split groups with multiple optional responses.

Figure 6:
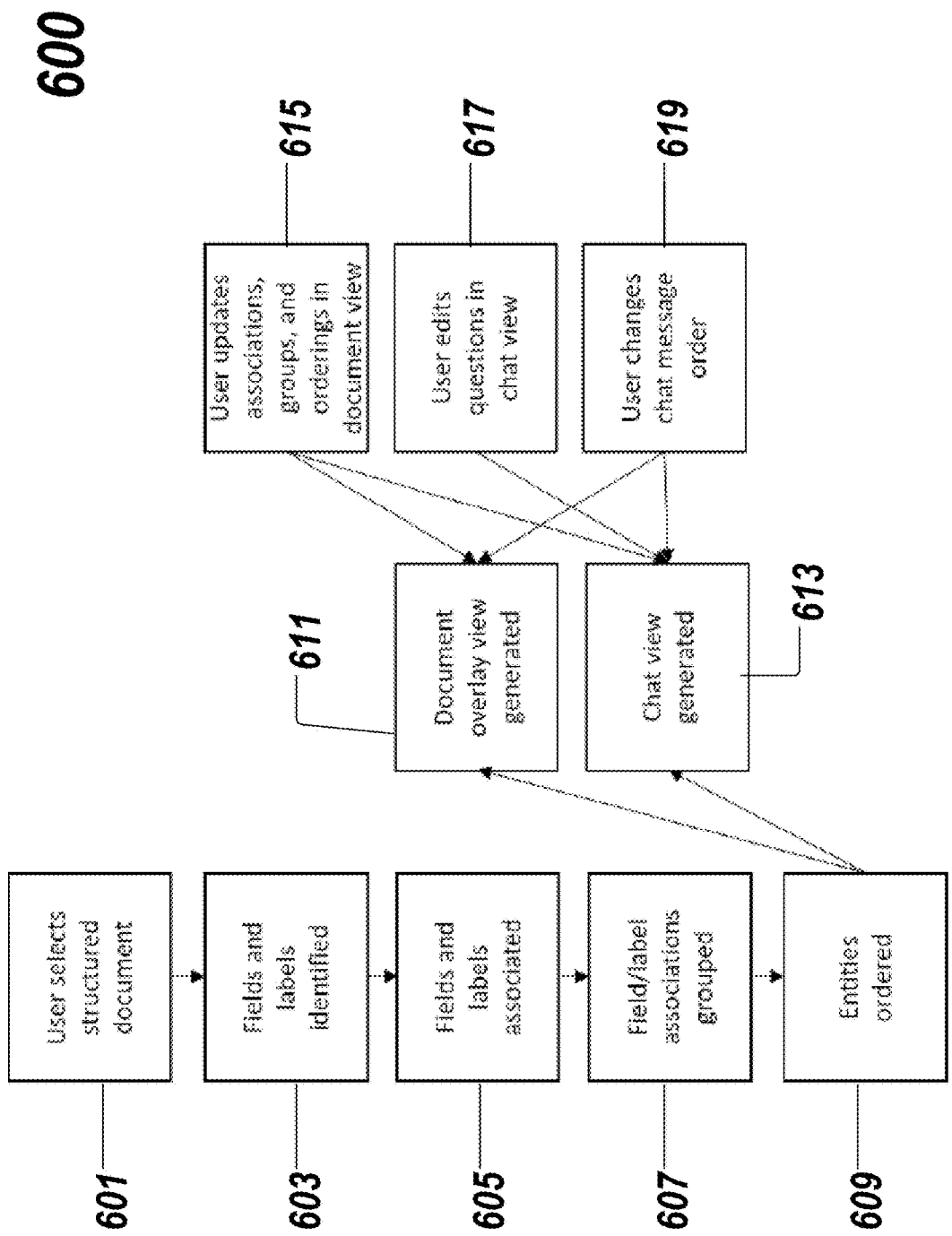
FIG. 6 illustrates a method of converting from a structured document to a chat-based interaction according to an example implementation.

FIG. 6 illustrates an example implementation of a method 600 of converting the structured document into a chat based interaction. At 601, the administrator (e.g., including but not limited to an operator given access control to convert documents from a structural form to a conversation-based form, or make changes thereto) selects a structured document. For example but not by way of limitation, the administrator may select a document similar to the related art document of FIG. 1.

At 603, the fields and labels of the structured document are identified. For example but not by way of limitation, this operation may be performed automatically, without input from the administrator or other users.

At 605, the fields and labels are associated with one another. For example but not by way of limitation, this operation may be performed automatically, without input from the administrator or other users.

At 607, the field/label associations are grouped. For example but not by way of limitation, this operation may be performed automatically, without input from the administrator or other users.

At 609, the entities of the structured document were ordered with respect to one another.

At 611, a document overlay view is generated, and at 613, a chat view is generated.

At 615, the administrator provides information to update associations between fields and labels, groupings of field/label associations, and orderings, in the document overlay view. When the document overlay view of 611 is modified based on input from the administrator, the chat view as generated in 613 is also updated, so that the administrator can visualize how the input to the document overlay view of 611 impacts chat view of 613.

At 617, for the chat view generated in 613, the administrator edits questions in the chat view. Further, at 619, the administrator may change and ordering of the messages in the chat conversation. When the chat view of 613 is modified based on input from the administrator, the document overlay view of 611 is also updated, so that the administrator can visualize how the input to the chat view of 613 impacts chat view of document overlay view of 611.

Figure 7:
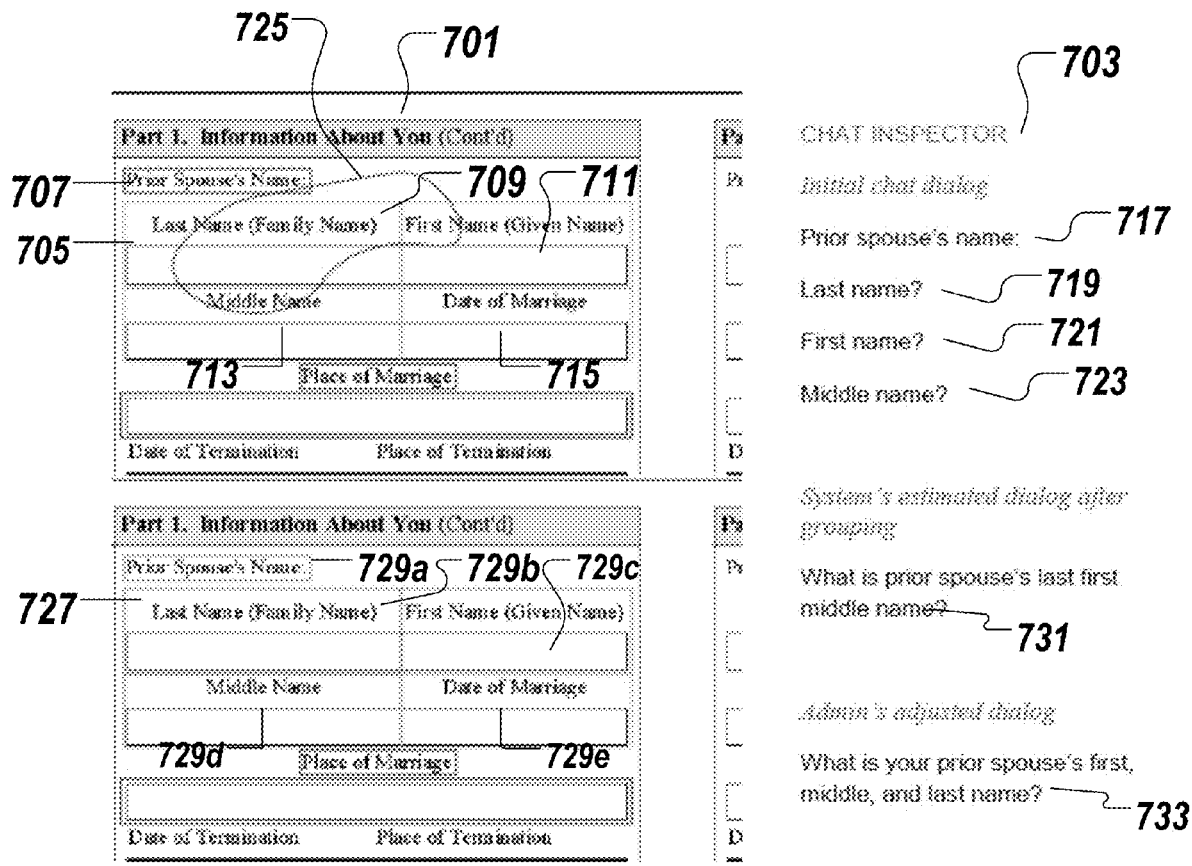
FIG. 7 illustrates grouping of field/label associations, and an associated tool for performing the grouping, according to an example implementation.

FIG. 7 illustrates an example implementation of the forgoing scheme as illustrated in FIG. 6. More specifically, a tool 700 is provided that includes a document overlay view 701 and a chat view 703. The document overlay view 701 includes an initial structured document 705, which includes a label 707, and field/label associations 709, 711, 713 and 715, for example. In the chat view 703, a direct conversion result is shown, which displays label 717, followed by sequential question 719, 721, 723, associated with field/label associations 709, 711 and 713.

To update the document view 701, the administrator provides an input 725, in this example the input is provided as a mark that contacts the fields to be associated. For example, but not by way of limitation, this can include a closed curve, an open curve, or other marked indicative of a selection by an administrator of the plurality of groups. The mark may be input via any well-known input device, including but not limited to a touchscreen, a mouse, a pen-based approach, or other means as would be understood by those of ordinary skill in the art.

Based on the input 725, and updated document overlay view is provided as structured document 727, which displays, in a common color, and an association between label 729a and field/label associations 729b, 729c, 729d and 729e. Based on this association, the chat view 703 generates a single question 731. Subsequently, in the chat view 703, the administrator may edit the exact language of the question to generate an adjusted dialogue 733.

As shown in FIG. 7, and according to an example implementation, the field/label associations can be grouped together with open labels with a simple closed form gesture. All items crossed by the gesture are included in the group. In the example implementation illustrated in Figured 7, three name field/label associations (shown in orange as 709, 711, 713) are joined together with one open label (shown in blue as 707), to form a single group (shown in green as 729a, 729b, 729c, 729d). The chat inspector interface shows the chat dialog that will be provided to the user.

Before grouping, the system uses the open label as a preamble at 717, and then outputs each label as a separate question as 719, 721, 723 (removing text in parenthesis). After grouping, the system applies a basic text cleaning algorithm to remove duplicate text ("name") at 731. The administrator can further edit the dialog to improve readability at 733.

Figure 8:
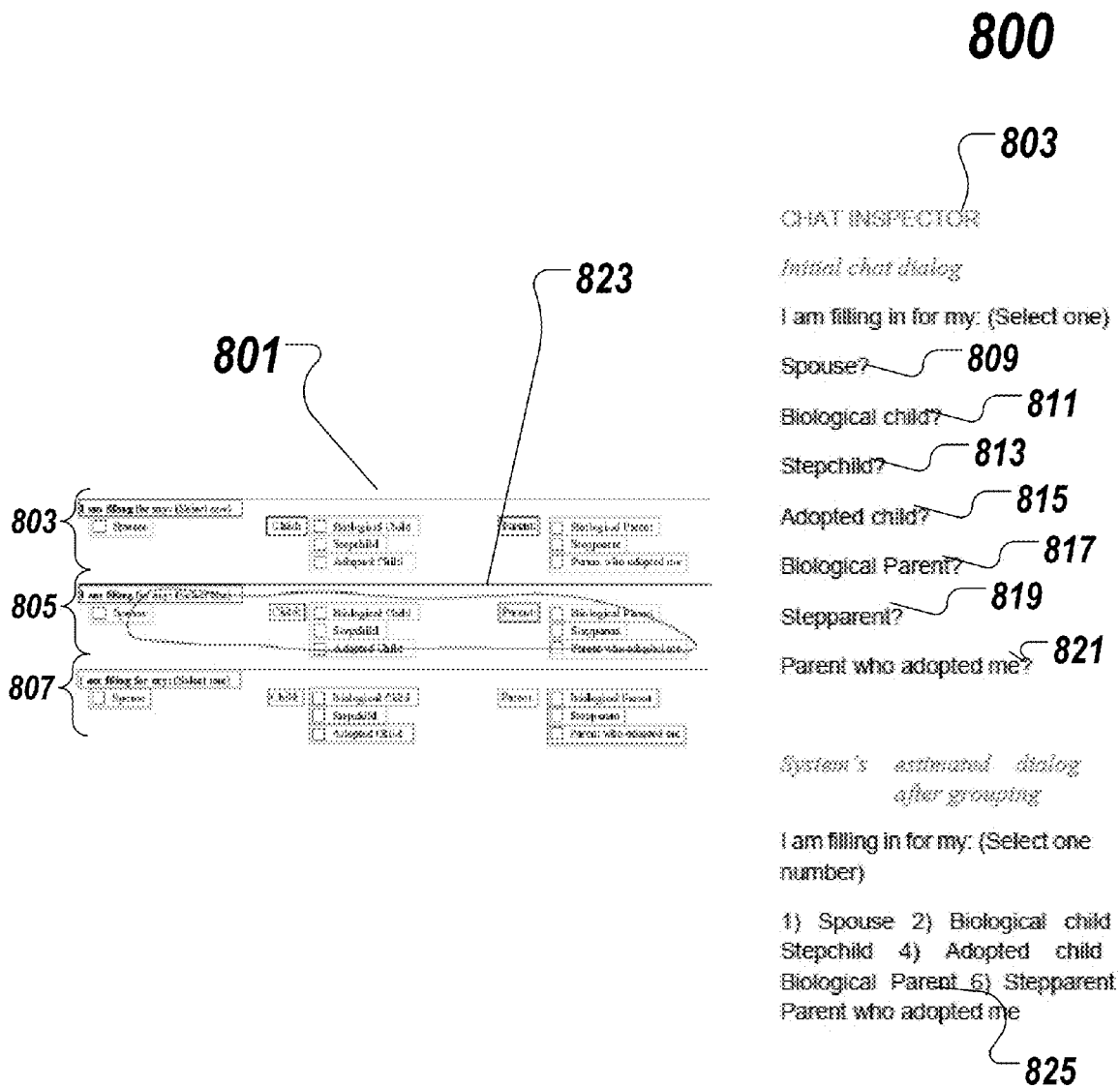
FIG. 8 illustrates grouping of field/label associations, and an associated tool for performing the grouping, according to an example implementation.

As shown in FIG. 8, a tool 800 according to another example implementation includes grouping of field/label associations. As explained above, a document overlay view 801 and a chat view 803 are provided. As shown in the first document overlay view 803, the checkboxes are not grouped, and thus, the chat view 803 presents the questions as fields 809, 811,813, 815, 817, 819, 821 associated with corresponding checkboxes in the first document overlay view 803. As shown in 805, the administrator provides an input 823 to group the checkboxes, to be grouped with open labels. As shown in 807, the checkboxes are treated like a single entity (e.g., as if they are radio buttons such that only a single field can be selected from the group). The chat view 803 reflects this change at 825, condensing a series of questions to one single question sent to the user.

As shown in FIG. 9, a tool 900 is provided such that an administrator can draw a line to order items. More specifically, in the document overlay view 901, a line 905 is drawn to order items in a sequence. More specifically, the first line 905 orders the top group (green) before the later label 907 (blue), field 909 (blue), and field/label association 911 (orange).

Figure 10:
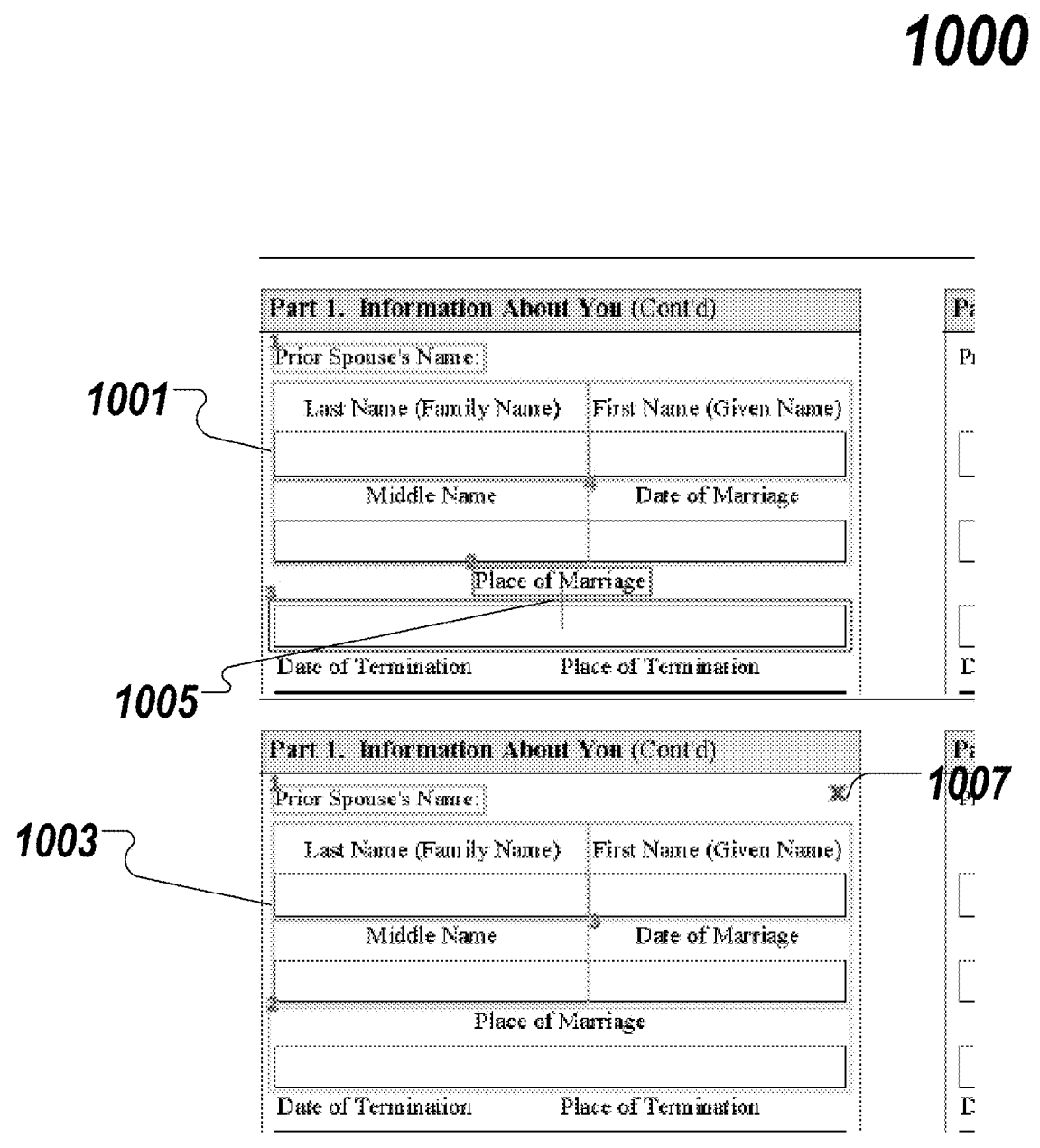

Further, as shown in FIG. 10, a tool 1000 is provided for the administrator to draw a line to associate fields and labels. In the document overlay view 1001, a line 1005 creates a field/label association at 1001. Then, after the field and label are associated, at 1003, the ordering updates appropriately. Administrators can also click on an "x" a 1007, to cancel a grouping.

Figure 11:
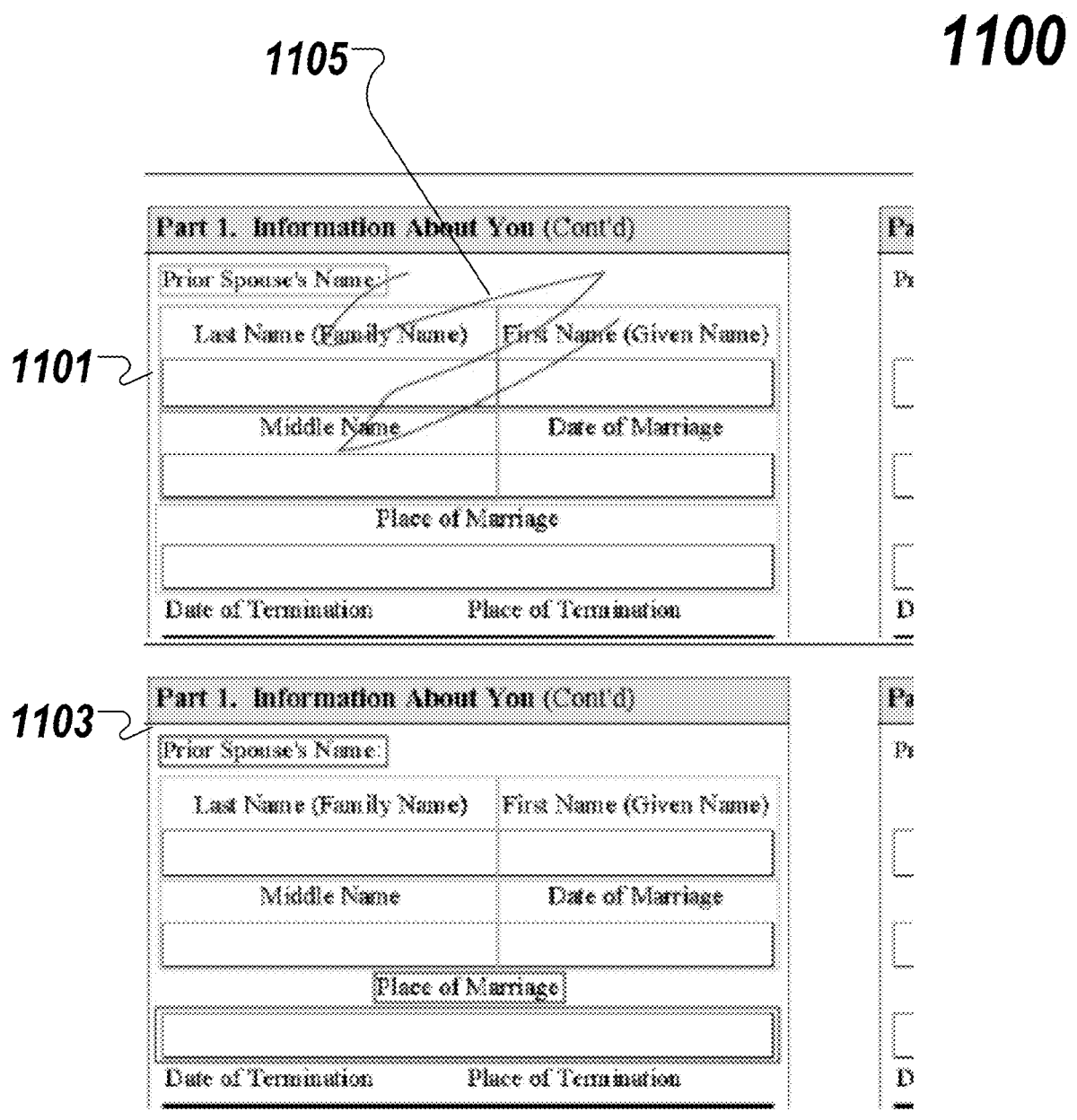

As shown in FIG. 11, the tool 1100 may provide, in the document overlay view 1101, an input for the administrator to make a prescribed mark 1105 (e.g., scribble) through a group, for example, to remove the group, as shown in 1103. However, any previous field/label associations are retained.

Figure 12:
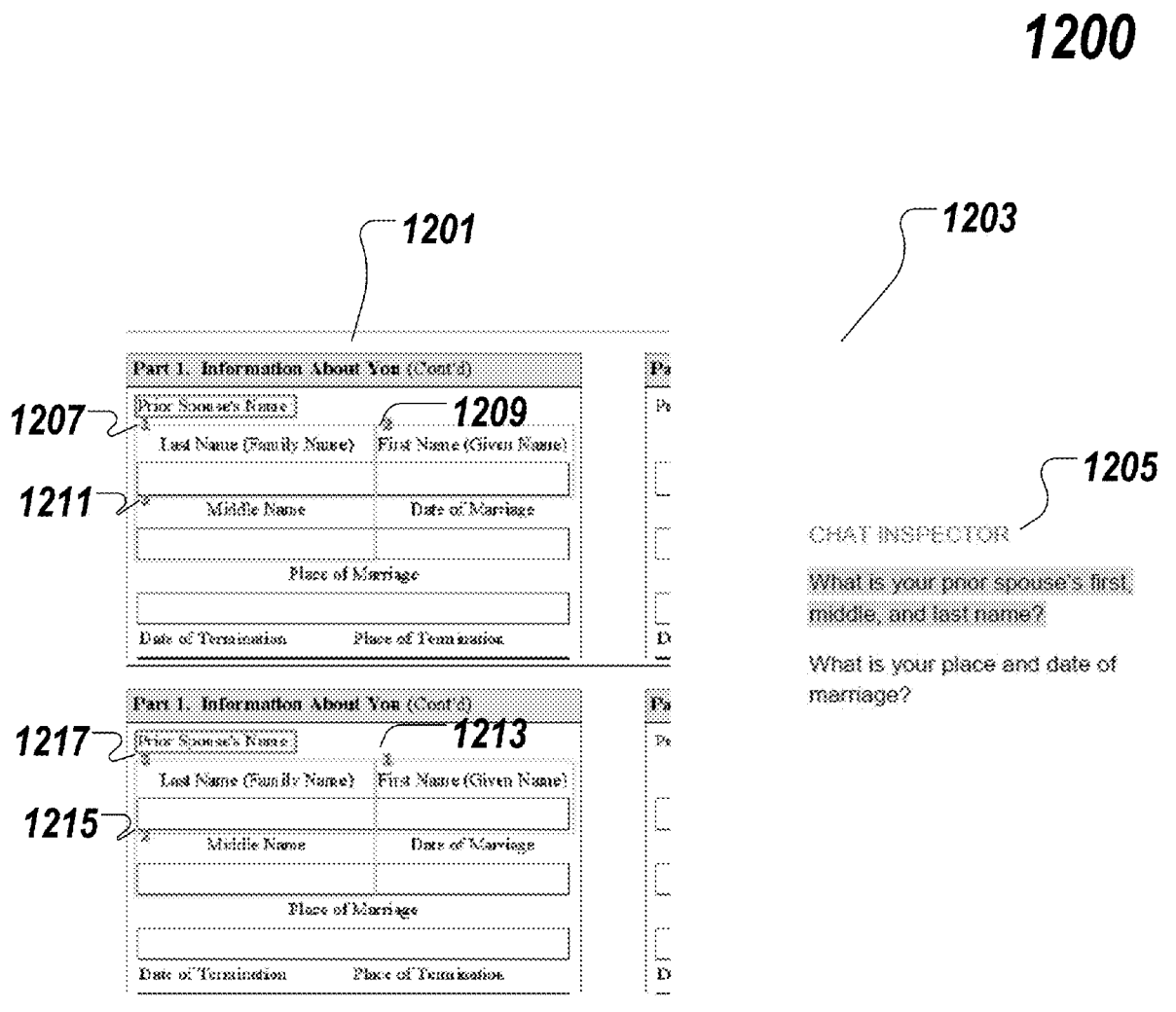

FIG. 12 shows an example implementation of the administrator design tool 1200. The document overlay view 1201 and the chat view 1203 are provided, as discussed above. Further, the document overlay view 1201 shows an ordering of last name 1207, first name 1209 and then middle name 1211. In the question 1205 provided in the chat view 1203, the administrator has re-sequenced the fields to a more natural conversational question (e.g., first, middle, last name), by selecting and highlighting the question to inspect the field/label association or group that the question corresponds to in the document (once clicked, the question text is highlighted in the chat inspector). The administrator can thus reorder field/label associations within a group. This change is reflected in the document overlay view, as shown in 1213, 1217, 1215 as the sequence indicator (e.g., number). The administrator may reorder the fields so that tokenized responses (e.g., first, middle, last name) match the ordering of the fields. Note that the open label ("Prior spouse's name") is ignored when aligning the response ordering, since it includes no field and therefore requires no direct response.

Figure 13:
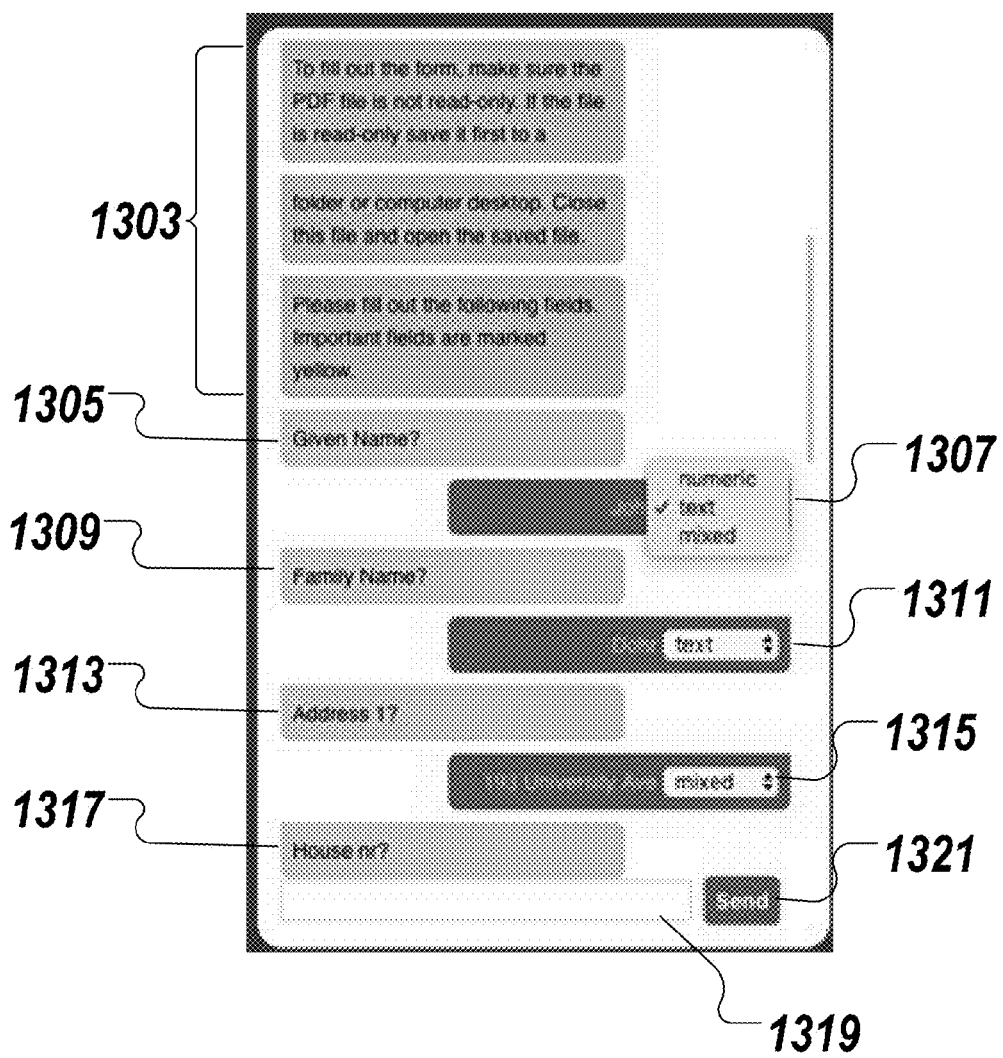
FIG. 13 illustrates grouping of field/label associations, and an associated tool for performing the grouping, according to an example implementation.

FIG. 13 illustrates an example implementation of the chat view 1300 (e.g., chat inspector interface). In the chat view 1301, the administrator may specify response constraints and examples for each question. For example, after instructions 1303, a prompt for given name 1305 allows the administrator to select at 1307 a data type for the user's response. Similar options are shown at 1309 and 1311, 1313 and 1315, and 1317 and 1319, respectively. An object (e.g., button) is provided to transmit the input information.

Fields may have certain response requirements so that they can be remapped to a common format for downstream entry in a database. These constraints can take the form of different patterns, e.g. any text, any number, or a specific format such as MM/DD/YY or DD/MM/YYYY, etc. As shown above and discussed with respect to FIG. 13, administrators may supply such response constraints as well as example entries in the chat inspector.

The system can optionally infer constraints from metadata gleaned form the form itself or learned from past entries. Where there is neither document information nor any common sense default for a field nor any response constraints set by the administrator, the system can assume unformatted input by default.

Figure 14:
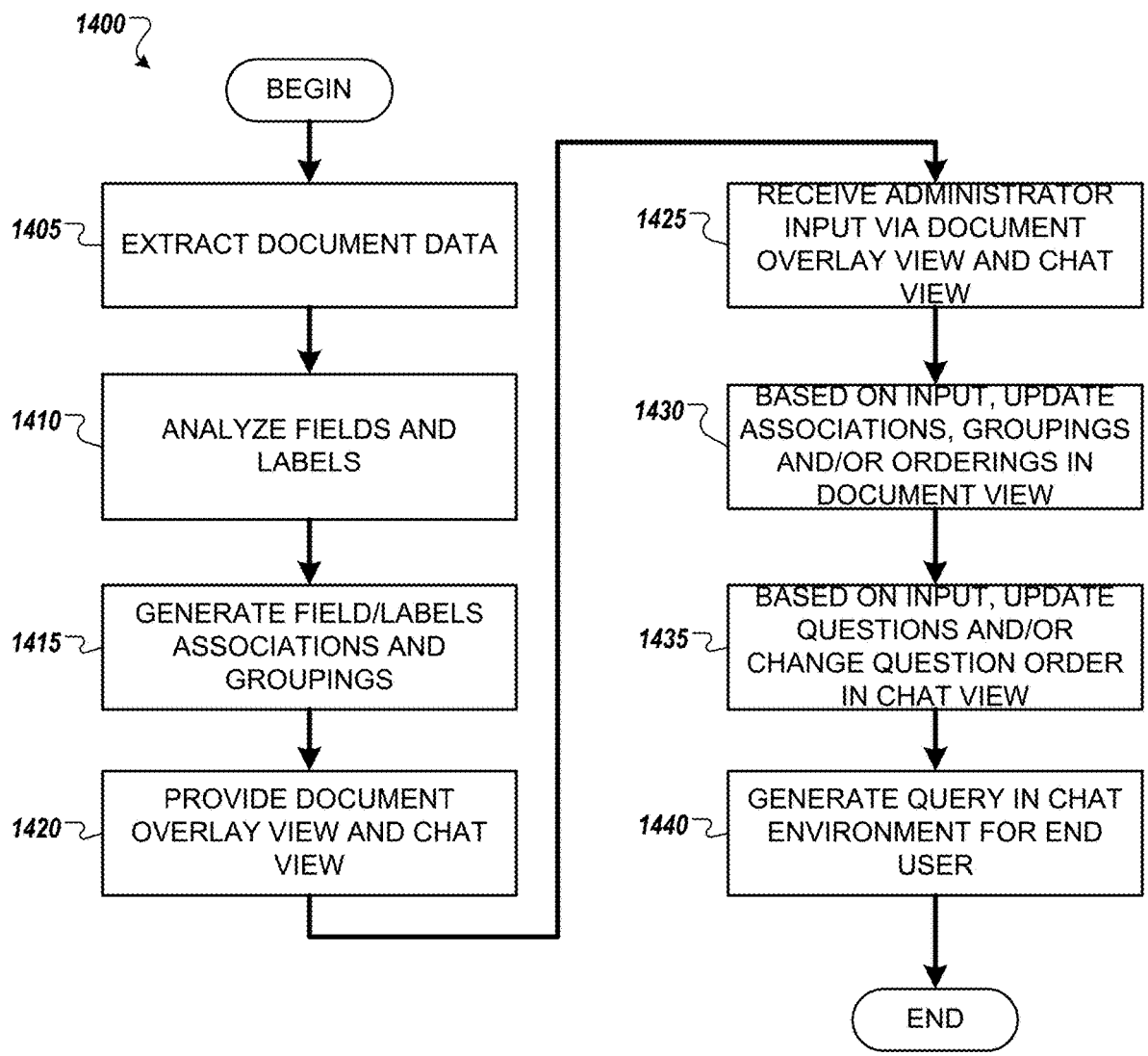
FIG. 14 illustrates a method in accordance with example implementations.

FIG. 14 illustrates a method 1400 of the example implementation. At 1405, document data is extracted. At 1410, fields and labels are analyzed. At 1415, associations between fields and labels are generated, as well as groupings as explained above. At 1420, views are generated for the user, including a document overlay view and a chat view. These views provide the administrator with a tool to provide input and receive output in accordance with the example implementations. At 1425, the administrator provides input via the document overlay view and/or the chat view, as explained above. For example but not by way of limitation, the administrator may input a gesture or provide a line at the document overlay view, or perform other actions consistent with the disclosures for the example implementations. The administrator may similarly provide input at the chat view. At 1430, based on the input from the administrator, the associations, groupings, and/or orderings are updated in the document view, and correspondence back-end changes are propagated as explained above. At 1435, based on the administrator input, changes are made to the chat view, as also explained above. At 1440, once the administrator has completed input, the chat interface may be provided to a user for performing queries that were previously associated with the document-based approach. The foregoing operations are explained in the above manner. However, it is recognized that the sequence of one or more of the operations may be modified without departing from the inventive scope.

For the example implementation, a working example is provided that can process web and PDF forms, two common form types in the enterprise. For web forms, a server-side rendering engine may be based on Chrome Headless images and extract a JSON (JavaScript Object Notation) representation of the form fields (e.g., text and bounding boxes). For PDF forms, PDFBOX may be used to image and also extract form fields if the PDF is form-enabled. For web forms, the algorithm may use LABEL fields associated with INPUT fields. For PDF forms, the system may compare the location of text with close-by form fields, and may also match form field names with nearby open text, to provide an initial grouping. The image of the forms without the text is used to group fields (e.g., found inside a box using heuristic image processing methods).

The web interface displays the web or PDF form and uses the JSON representation to overlay boxes. A CANVAS allows administrators to draw over the form in order to create or modify the groups.

A chat interface was also built to show how the form will be shown in a real chat. We are implementing a version that generates Microsoft's FormFlow-compatible dialog scripts (using NodeJS) that can be deployed to several popular chat platforms such as Slack, Messenger, Skype and plain text-based SMS.

The example implementations may have various advantages and benefits over the related art. For example, but not by way of limitation, some related art solutions may insert fragments of the structured document content such as forms directly into the chat client. Accordingly, the user may be able to submit responses to forms inside the chat tools. However, such related art approaches do not translate the structured document into a chat-based interaction.

Further, some related art chatbot platforms can support conversational interaction with users to complete forms. However, those related tools require manual configuration, such as defining desired entities for users to supply, and specifying their required formats.

In contrast to the related art, the example implementation may accelerate the process of converting structured documents to chat-based interaction by combining analysis and interface elements allowing for rapid, flexible construction of a chat dialogue, based on a source document. The related art conversion methods are direct (e.g., automatic), and do not leverage a semi-automated interface, and are thus limited and require the administrator to understand programming concepts, and manually transfer document structure to the conversational interface.

Figure 15:
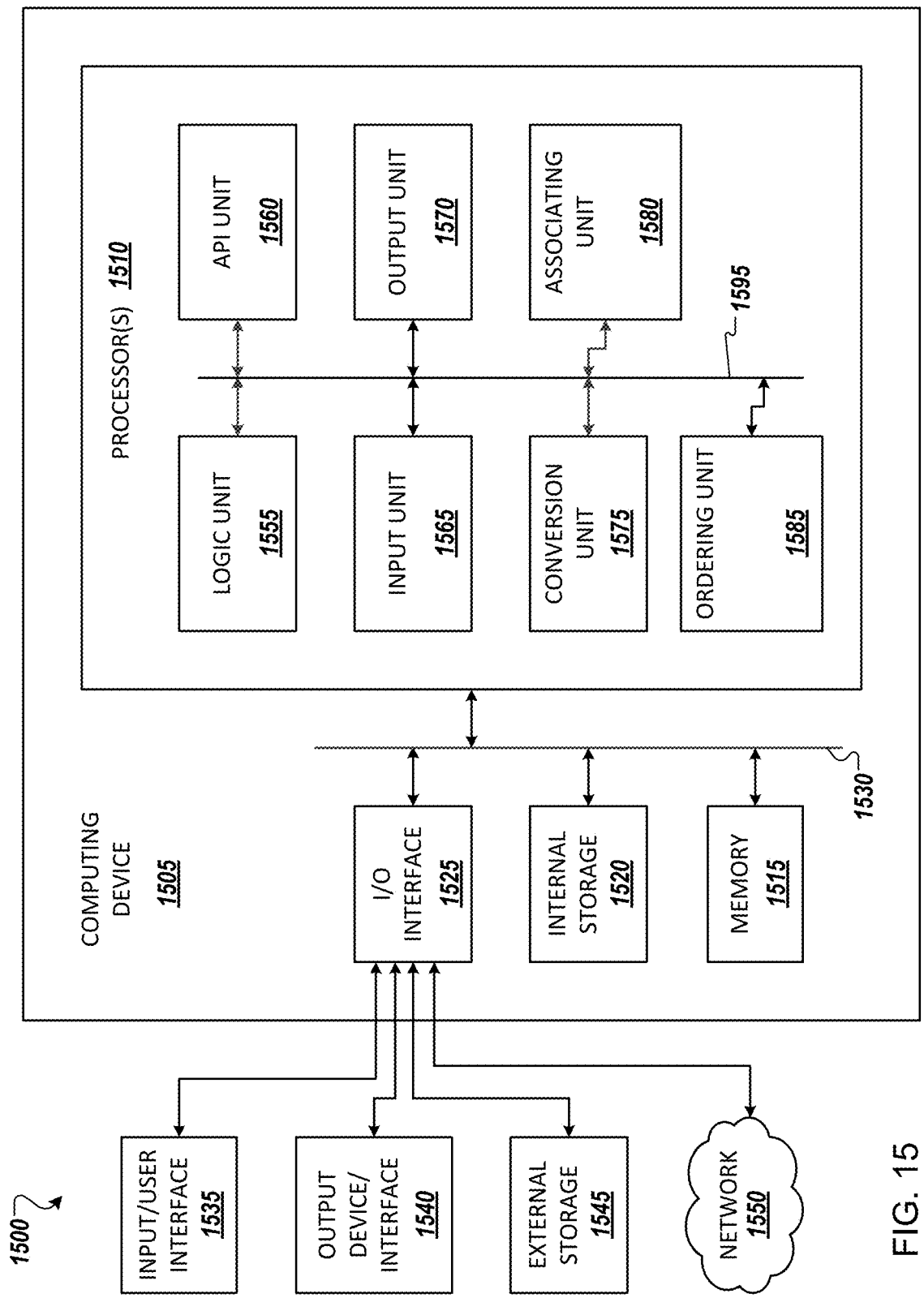
FIG. 15 illustrates an example computing environment with an example computer device suitable for use in some example implementations of the present application.

FIG. 15 illustrates an example computing environment 1500 with an example computer device 1505 suitable for use in some example implementations. Computing device 1505 in computing environment 1500 can include one or more processing units, cores, or processors 1510, memory 1515 (e.g., RAM, ROM, and/or the like), internal storage 1520 (e.g., magnetic, optical, solid state storage, and/or organic), and/or I/O interface 1525, any of which can be coupled on a communication mechanism or bus 1530 for communicating information or embedded in the computing device 1505.

Computing device 1505 can be communicatively coupled to input/interface 1535 and output device/interface 1540. Either one or both of input/interface 1535 and output device/interface 1540 can be a wired or wireless interface and can be detachable. Input/interface 1535 may include any device, component, sensor, or interface, physical or virtual, which can be used to provide input (e.g., buttons, touch-screen interface, keyboard, a pointing/cursor control, microphone, camera, braille, motion sensor, optical reader, and/or the like). Output device/interface 1540 may include a display, television, monitor, printer, speaker, braille, or the like. In some example implementations, input/interface 1535 (e.g., user interface) and output device/interface 1540 can be embedded with, or physically coupled to, the computing device 1505. In other example implementations, other computing devices may function as, or provide the functions of, an input/interface 1535 and output device/interface 1540 for a computing device 1505.

Examples of computing device 1505 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 1505 can be communicatively coupled (e.g., via I/O interface 1525) to external storage 1545 and network 1550 for communicating with any number of networked components, devices, and systems, including one or more computing devices of the same or different configuration. Computing device 1505 or any connected computing device can be functioning as, providing services of, or referred to as a server, client, thin server, general machine, special-purpose machine, or another label.

I/O interface 1525 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and network in computing environment 1500. Network 1550 can be any network or combination of networks (e.g., the Internet, local area network, wide area network, a telephonic network, a cellular network, satellite network, and the like).

Computing device 1505 can use and/or communicate using computer-usable or computer-readable media, including transitory media and non-transitory media. Transitory media includes transmission media (e.g., metal cables, fiber optics), signals, carrier waves, and the like. Non-transitory media included magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 1505 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1510 can execute under any operating system (OS) (not shown), in a native or virtual environment. One or more applications can be deployed that include logic unit 1555, application programming interface (API) unit 1560, input unit 1565, output unit 1570, conversion unit 1575, association unit 1580, ordering unit 1585, and inter-unit communication mechanism 1595 for the different units to communicate with each other, with the OS, and with other applications (not shown). For example, the conversion unit 1575, the association unit 1580, and the ordering unit 1585 may implement one or more processes shown in FIGS. 6 and 14. The described units and elements can be varied in design, function, configuration, or implementation and are not limited to the descriptions provided.

In some example implementations, when information or an execution instruction is received by API unit 1560, it may be communicated to one or more other units (e.g., logic unit 1555, input unit 1565, conversion unit 1575, association unit 1580, and ordering unit 1585). For example, the conversion unit 1575 may convert labels into questions and provide the converted questions to a chat view. Similarly, the association unit 1580 may associate labels and fields, as well as grouping associated labels and label/field pairs, based on an administrator input. Additionally, the association unit 1580 may order associated pairs, groups and other labels.

In some instances, the logic unit 1555 may be configured to control the information flow among the units and direct the services provided by API unit 1560, input unit 1565, conversion unit 1575, association unit 1580, and ordering unit 1585 in some example implementations described above. For example, the flow of one or more processes or implementations may be controlled by logic unit 1555 alone or in conjunction with API unit 1560.

Figure 16:
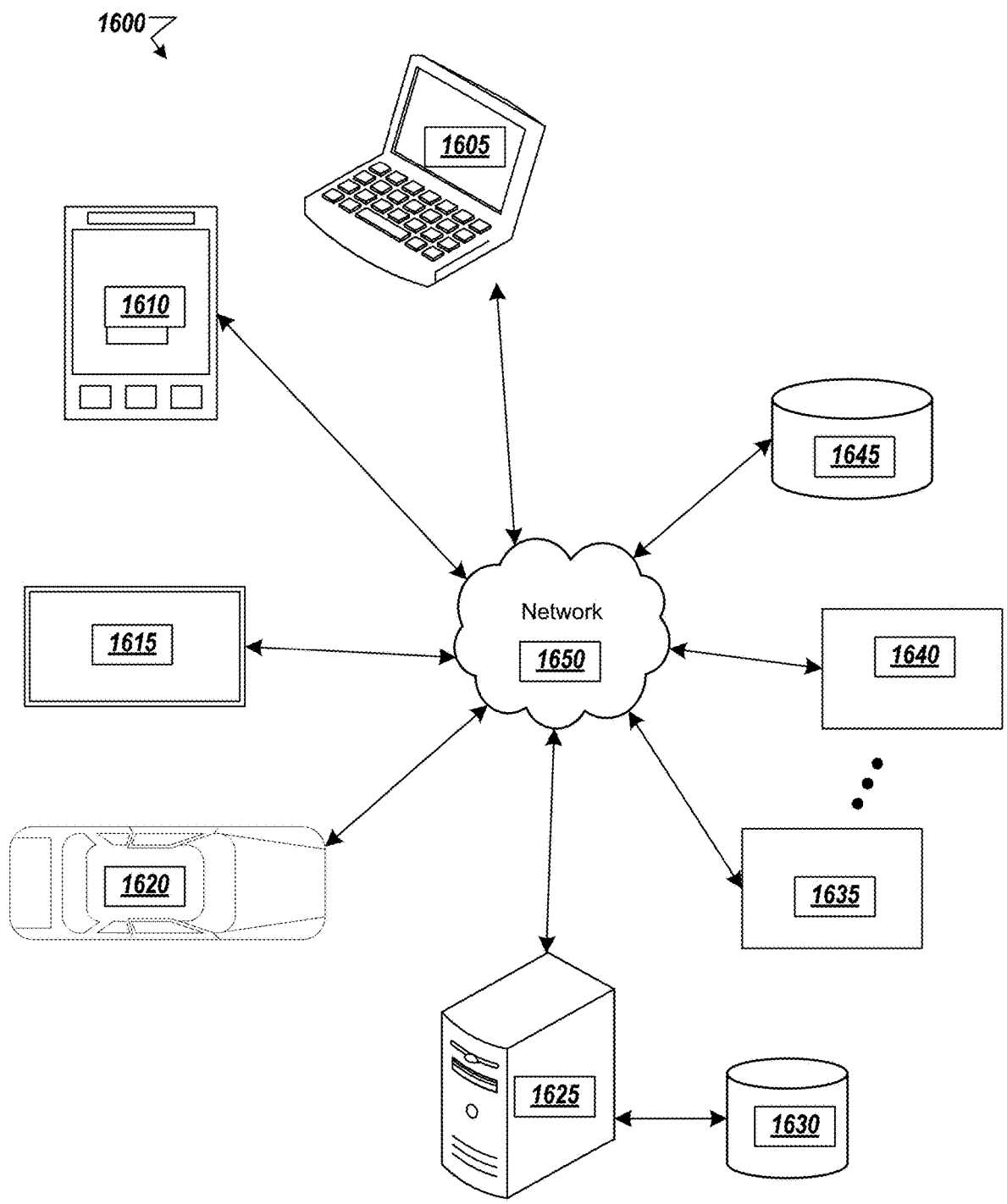
FIG. 16 shows an example environment suitable for some example implementations.

FIG. 16 shows an example environment suitable for some example implementations. Environment 1600 includes devices 1605-1645, and each is communicatively connected to at least one other device via, for example, network 1660 (e.g., by wired and/or wireless connections). Some devices may be communicatively connected to one or more storage devices 1630 and 1645.

An example of one or more devices 1605-1645 may be computing devices 1505 described in FIG. 15, respectively. Devices 1605-1645 may include, but are not limited to, a computer 1605 (e.g., a laptop computing device) having a monitor and as associated webcam as explained above, a mobile device 1610 (e.g., smartphone or tablet), a television 1615, a device associated with a vehicle 1620, a server computer 1625, computing devices 1635-1640, storage devices 1630 and 1645.

In some implementations, devices 1605-1620 may be considered user devices associated with the users of the enterprise. Devices 1625-1645 may be devices associated with service providers (e.g., used by the external host to provide services as described above and with respect to the various drawings, and/or store data, such as webpages, text, text portions, images, image portions, audios, audio segments, videos, video segments, and/or information thereabout).

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A method of converting a document from a first structure to a second structure, comprising:
   extracting data of the document to associate fields and labels in the first structure to generate field/label associations of the document for the first structure;
   generating a grouping comprising a field/label association by an automatic input that does not require an operator;
   receiving a non-automated operator input selecting the field/label association and one or more other field/label associations or an open label;
   updating the grouping, in a semi-automatic manner, based on the received non-automated operator input to associate the field/label association with the one or more other field/label associations or the open label; and
   based on the operator input and a spatial arrangement of the first structure, providing the grouping in the second structure, the grouping is remapped as a natural conversational unit that replaces the field and the label,
   wherein for the operator input provided at the first structure, and the natural conversation unit comprises a single query including the field/label association and the one or more other field/label associations or the open label,
   wherein the operator input comprises at least one of a gesture and a line that remaps the field and label of the first structure into the natural conversational unit of the second structure, and
   wherein the gesture is a mark associated with the received operator input, wherein the mark contacts the field/label association to be grouped with the one or more other field/label associations.

2. The method of claim 1, wherein the first structure is a document-based structure and the second structure is a chat-based structure.

3. The method of claim 1, wherein for the operator input provided at the first structure, the grouping comprises the field/label association and the one or more other field/label associations including a corresponding plurality of checkboxes, and the natural conversation unit comprises a single query including the field/label association and the one or more other field/label associations or an open label associated with the plurality of checkboxes.

4. The method of claim 1, wherein for the operator input at the second structure, the operator input comprises an edit of a format of the natural conversation unit and an edit of a sequence of the field/label association and the one or more other field/label associations.

5. The method of claim 1, wherein an ordering of the field/label association with the one or more other field/label associations in the second structure is arranged based on an ordering of the field/label association with the one or more other field/label associations in the first structure, or in response to the operator input.

6. The method of claim 1, wherein an end user input received via the second structure in response to the natural conversational unit is provided to the first structure based on the field/label association and the another field/label association, wherein the remapping is performed by string processing.

7. The method of claim 1, wherein the operator input is a line.

8. The method of claim 1, wherein the operator input is at least one of a continuous gesture and a continuous line that contacts each of the field/label association and the one or more other field/label associations of the plurality of field label associations or the open label, wherein contact with the input is indicative of selection by the operator.

9. The method of claim 1, wherein the receiving the non-automated operator input comprising selecting the field/label association and a plurality of other field/label associations.

10. A non-transitory computer-readable medium for converting a document from a first structure to a second structure, the instructions comprising:
    extracting data of the document to associate fields and labels in the first structure to generate field/label associations of the document for the first structure;
    generating a grouping comprising a field/label association by an automatic input that does not require an operator;
    receiving a non-automated operator input selecting the field/label association and one or more other field/label associations or an open label;
    updating the grouping, in a semi-automatic manner, based on the received non-automated operator input to associate the field/label association with the one or more other field/label associations or the open label; and
    based on the operator input and a spatial arrangement of the first structure, providing the grouping in the second structure, the grouping is remapped as a natural conversational unit that replaces the field and the label,
    wherein for the operator input provided at the first structure, and the natural conversation unit comprises a single query including the field/label association and the one or more other field/label associations or the open label,
    wherein the operator input comprises at least one of a gesture and a line that remaps the field and label of the first structure into the natural conversational unit of the second structure, and
    wherein the gesture is a mark associated with the received operator input, wherein the mark contacts the field/label association to be grouped with the one or more other field/label associations.

11. The non-transitory computer-readable medium of claim 10, wherein the first structure is a document-based structure and the second structure is a chat-based structure.

12. The non-transitory computer-readable medium of claim 10, wherein for the operator input provided at the first structure, the grouping comprises the field/label association and the one or more other field/label associations including a corresponding plurality of checkboxes, and the natural conversation unit comprises a single query including the field/label association and the one or more other field/label associations or an open label associated with the plurality of checkboxes.

13. The non-transitory computer-readable medium of claim 10, wherein for the operator input at the second structure, the operator input comprises at least one of an edit of a format of the natural conversation unit, and an edit of a sequence of the field/label association and the one or more other field/label associations.

14. The non-transitory computer-readable medium of claim 10, wherein an ordering of the field/label association with the one or more other field/label associations in the second structure is arranged based on an ordering of the field/label association with the one or more other field/label associations in the first structure, or in response to the operator input.

15. The non-transitory computer-readable medium of claim 10, wherein an end user input received via the second structure in response to the natural conversational unit is provided to the first structure based on the field/label association and the another field/label association, wherein the remapping is performed by string processing.

* * * * *